US009225519B1

(12) United States Patent
Fraccaroli

(10) Patent No.: US 9,225,519 B1
(45) Date of Patent: Dec. 29, 2015

(54) METHOD, SYSTEM, AND APPARATUS FOR ENABLING SECURE FUNCTIONALITIES

(71) Applicant: Federico Fraccaroli, Irving, TX (US)

(72) Inventor: Federico Fraccaroli, Irving, TX (US)

( * ) Notice: Subject to any disclaimer, the term of this patent is extended or adjusted under 35 U.S.C. 154(b) by 0 days.

(21) Appl. No.: 14/636,138

(22) Filed: Mar. 2, 2015

(51) Int. Cl.
*H04L 29/00* (2006.01)
*H04L 9/08* (2006.01)
*G06Q 30/00* (2012.01)
*G06F 17/30* (2006.01)
*H04L 29/06* (2006.01)
*G06F 21/30* (2013.01)
*G06Q 30/02* (2012.01)
*H04L 9/32* (2006.01)

(52) U.S. Cl.
CPC ........ *H04L 9/0838* (2013.01); *G06F 17/30725* (2013.01); *G06Q 30/0185* (2013.01); *H04L 63/12* (2013.01); *H04L 63/126* (2013.01); *G06F 21/30* (2013.01); *G06Q 30/0225* (2013.01); *H04L 9/32* (2013.01)

(58) Field of Classification Search
CPC ............. H04L 9/08; H04L 9/32; H04L 63/08; H04L 63/12; G06F 17/30; G06F 21/03; G06F 21/08; G06Q 20/32; G06Q 30/018; G06Q 30/06
USPC .......... 726/1–4, 17, 21, 26–33; 713/168–181; 235/375–386
See application file for complete search history.

(56) References Cited

U.S. PATENT DOCUMENTS

| | | |
|---|---|---|
| 4,277,837 A | 7/1981 | Stuckert |
| 4,386,266 A | 5/1983 | Chesarek |
| 4,529,870 A | 7/1985 | Chaum |
| 4,636,950 A | 1/1987 | Caswell et al. |
| 4,686,515 A | 8/1987 | Anderson et al. |
| 4,688,026 A | 8/1987 | Scribner et al. |
| 4,689,478 A | 8/1987 | Hale et al. |
| 4,816,824 A | 3/1989 | Katz et al. |
| 4,857,716 A | 8/1989 | Gombrich et al. |
| 5,050,031 A | 9/1991 | Weiley |
| 5,267,315 A | 11/1993 | Narita et al. |
| 5,267,756 A | 12/1993 | Molee et al. |
| 5,276,311 A | 1/1994 | Hennige |
| 5,288,980 A | 2/1994 | Patel et al. |

(Continued)

FOREIGN PATENT DOCUMENTS

| | | |
|---|---|---|
| WO | WO9855970 A1 | 12/1998 |
| WO | WO0157807 A1 | 8/2001 |

OTHER PUBLICATIONS

Handbook of Applied Cryptography; Alfred J. Menezes, Paul C. van Oorschot, and Scott A. Vanstone; CRC Press 1996.*

(Continued)

*Primary Examiner* — Madhuri Herzog
(74) *Attorney, Agent, or Firm* — Federico Fraccaroli

(57) ABSTRACT

In accordance with one embodiment of the present invention, a method comprises receiving attributes data for a tagged item that are measured or recorded by sensors of a user equipment such as a smart phone. Attributes of record can be securely stored and can be controlled remotely. By comparing measured attributes with attributes of record according to a predetermined algorithm, a preset functionality, associated with said tagged item, is selectively enabled. In some implementations, the present invention is used to validate the authenticity of documents or objects. In some implementations, an optical code is used to tag said item.

20 Claims, 5 Drawing Sheets

(56) References Cited

U.S. PATENT DOCUMENTS

| | | | |
|---|---|---|---|
| 5,306,049 A | 4/1994 | Schireck |
| 5,319,544 A | 6/1994 | Schmerer et al. |
| 5,361,134 A | 11/1994 | Hu et al. |
| 5,380,047 A | 1/1995 | Molee et al. |
| 5,436,970 A | 7/1995 | Ray et al. |
| 5,521,984 A | 5/1996 | Denenberg et al. |
| 5,548,110 A | 8/1996 | Storch et al. |
| 5,578,808 A | 11/1996 | Taylor |
| 5,585,787 A | 12/1996 | Wallerstein |
| 5,595,356 A | 1/1997 | Kewin |
| 5,604,802 A | 2/1997 | Holloway |
| 5,635,693 A | 6/1997 | Benson et al. |
| 5,640,002 A | 6/1997 | Ruppert et al. |
| 5,642,419 A | 6/1997 | Rosen |
| 5,673,338 A | 9/1997 | Denenberg et al. |
| 5,689,561 A | 11/1997 | Pace |
| 5,732,401 A | 3/1998 | Conway |
| 5,737,886 A | 4/1998 | Kruckemeyer |
| 5,770,843 A | 6/1998 | Rose et al. |
| 5,774,876 A | 6/1998 | Woolley et al. |
| 5,777,884 A | 7/1998 | Belka et al. |
| 5,794,213 A | 8/1998 | Markman |
| 5,796,351 A | 8/1998 | Yabuki |
| 5,825,299 A | 10/1998 | Fuentes et al. |
| 5,825,302 A | 10/1998 | Stafford |
| 5,870,733 A | 2/1999 | Bass et al. |
| 5,878,416 A | 3/1999 | Harris et al. |
| 5,895,073 A | 4/1999 | Moore |
| 5,930,770 A | 7/1999 | Edgar |
| 5,963,133 A | 10/1999 | Monjo |
| 5,963,134 A | 10/1999 | Bowers et al. |
| 5,963,919 A | 10/1999 | Brinkley et al. |
| 5,971,435 A | 10/1999 | DiCesare et al. |
| 6,002,344 A | 12/1999 | Bandy et al. |
| 6,026,378 A | 2/2000 | Onozaki |
| 6,030,001 A | 2/2000 | Kruckemeyer |
| 6,061,656 A | 5/2000 | Pace |
| 6,070,141 A | 5/2000 | Houvener et al. |
| 6,076,064 A | 6/2000 | Rose, Jr. |
| 6,112,984 A | 9/2000 | Snavely |
| 6,131,811 A | 10/2000 | Gangi |
| 6,148,091 A | 11/2000 | DiMaria |
| 6,149,055 A | 11/2000 | Gatto |
| 6,170,746 B1 | 1/2001 | Brook et al. |
| 6,195,006 B1 | 2/2001 | Bowers et al. |
| 6,203,069 B1 | 3/2001 | Outwater et al. |
| 6,224,109 B1 | 5/2001 | Yang |
| 6,226,619 B1 | 5/2001 | Halperin et al. |
| 6,232,876 B1 | 5/2001 | Maloney |
| 6,250,549 B1 | 6/2001 | DeFabio, Jr. |
| 6,265,977 B1 | 7/2001 | Vega et al. |
| 6,266,651 B1 | 7/2001 | Woolston |
| 6,270,011 B1 | 8/2001 | Gottfried |
| 6,304,856 B1 | 10/2001 | Soga et al. |
| 6,305,603 B1 | 10/2001 | Grunbok et al. |
| 6,309,690 B1 | 10/2001 | Brogger et al. |
| 6,324,522 B2 | 11/2001 | Peterson et al. |
| 6,325,292 B1 | 12/2001 | Sehr |
| 6,330,971 B1 | 12/2001 | Mabry et al. |
| 6,338,053 B2 | 1/2002 | Uehara et al. |
| 6,346,885 B1 | 2/2002 | Curkendall |
| 6,357,662 B1 | 3/2002 | Helton et al. |
| 6,402,029 B1 | 6/2002 | Gangi |
| 6,415,978 B1 | 7/2002 | McAllister |
| 6,431,439 B1 | 8/2002 | Suer et al. |
| 6,480,108 B2 | 11/2002 | McDonald |
| 6,494,367 B1 | 12/2002 | Zacharias |
| 6,505,094 B2 | 1/2003 | Pape et al. |
| 6,557,758 B1 | 5/2003 | Monico |
| 6,559,620 B2 | 5/2003 | Zhou et al. |
| 6,591,252 B1 | 7/2003 | Young |
| 6,594,475 B1 | 7/2003 | Anvekar et al. |
| 6,676,017 B1 | 1/2004 | Smith, III |
| 6,686,881 B1 | 2/2004 | Lu et al. |
| 6,700,493 B1 | 3/2004 | Robinson et al. |
| 6,707,381 B1 | 3/2004 | Maloney |
| 6,714,121 B1 | 3/2004 | Moore |
| 6,735,324 B1 | 5/2004 | McKinley et al. |
| 6,750,765 B1 | 6/2004 | van Wijk |
| 6,758,403 B1 | 7/2004 | Keys et al. |
| 6,763,996 B2 | 7/2004 | Rakers et al. |
| 6,774,811 B2 | 8/2004 | Kaufman et al. |
| 6,816,075 B2 | 11/2004 | Grunes et al. |
| 6,847,892 B2 | 1/2005 | Zhou et al. |
| 6,956,538 B2 | 10/2005 | Moore |
| 7,019,644 B2 | 3/2006 | Barrie |
| 7,114,656 B1 | 10/2006 | Garver |
| 7,129,837 B2 | 10/2006 | Shannon et al. |
| 7,136,832 B2 | 11/2006 | Li et al. |
| 7,156,312 B2 | 1/2007 | Becker et al. |
| 7,158,038 B2 | 1/2007 | Fujie |
| 7,298,264 B1 | 11/2007 | Kuzma et al. |
| 8,898,077 B2 * | 11/2014 | Davis, Jr. ........................ 705/28 |
| 2001/0000019 A1 | 3/2001 | Bowers |
| 2001/0014955 A1 | 8/2001 | Achiwa et al. |
| 2001/0018660 A1 | 8/2001 | Sehr |
| 2001/0034717 A1 | 10/2001 | Whitworth |
| 2001/0041214 A1 | 11/2001 | Brogger et al. |
| 2001/0042059 A1 | 11/2001 | Uehara et al. |
| 2001/0047340 A1 | 11/2001 | Snow et al. |
| 2001/0049606 A1 | 12/2001 | Lucarelli |
| 2001/0051905 A1 | 12/2001 | Lucas |
| 2002/0005774 A1 | 1/2002 | Rudolph et al. |
| 2002/0029342 A1 | 3/2002 | Keech |
| 2002/0049656 A1 | 4/2002 | Lancos et al. |
| 2002/0052193 A1 | 5/2002 | Chetty |
| 2002/0059147 A1 | 5/2002 | Ogasawara |
| 2002/0062280 A1 | 5/2002 | Zachariassen et al. |
| 2002/0073044 A1 | 6/2002 | Singhal |
| 2002/0077956 A1 | 6/2002 | Solheim |
| 2002/0107610 A1 | 8/2002 | Kaehler et al. |
| 2002/0111819 A1 | 8/2002 | Li et al. |
| 2002/0123955 A1 | 9/2002 | Andreski et al. |
| 2002/0143635 A1 | 10/2002 | Goodwin, III |
| 2002/0178363 A1 | 11/2002 | Ambrogio et al. |
| 2002/0188702 A1 | 12/2002 | Short, III et al. |
| 2003/0018894 A1 | 1/2003 | Hall |
| 2003/0046543 A1 | 3/2003 | Houston et al. |
| 2003/0069648 A1 | 4/2003 | Douglas et al. |
| 2003/0120745 A1 | 6/2003 | Katagishi et al. |
| 2003/0195818 A1 | 10/2003 | Howell et al. |
| 2003/0220885 A1 | 11/2003 | Lucarelli et al. |
| 2004/0088231 A1 | 5/2004 | Davis, Jr. |
| 2004/0098350 A1 | 5/2004 | Labrou et al. |
| 2005/0137882 A1 | 6/2005 | Cameron et al. |
| 2005/0289061 A1 | 12/2005 | Kulakowski et al. |
| 2014/0279613 A1 * | 9/2014 | Lee et al. ........................ 705/318 |
| 2015/0235235 A1 * | 8/2015 | Koren ................ G06Q 30/0185 705/318 |

OTHER PUBLICATIONS

Liu, Shiyang. "Anti-counterfeit system based on mobile phone QR code and fingerprint." Intelligent Human-Machine Systems and Cybernetics (IHMSC), 2010 2nd International Conference on. vol. 2. IEEE, 2010.*

* cited by examiner

METHOD, SYSTEM, AND APPARATUS FOR ENABLING SECURE FUNCTIONALITIES

TECHNICAL FIELD

The present application relates generally to authentication and/or verification of documents and/or commercial transactions related to objects or property in general by means of an ID proxy, such as an optical code, that has been associated to attributes securely stored in one or more remote servers.

BACKGROUND

The present application incorporates in its entirety all the disclosures of U.S. Patent Application 2014-0019246 A1 filed on Jul. 13, 2012 and titled "Method and Apparatus for Location Based conditional offers."

The present application incorporates in its entirety all the disclosures of U.S. Patent Application US 20130015236 filed on Jul. 15, 2011 and titled "High-value document authentication system and method."

The present application incorporates in its entirety all the disclosures of U.S. Patent Application US20140229735 filed on Aug. 8, 2012 and titled "Managing device ownership and commissioning in public-key encrypted wireless networks."

The present application incorporates in its entirety all the disclosures of U.S. Patent Application US20130085941 filed on Sep. 30, 2011 and titled "Systems and methods for secure wireless financial transactions."

The present application incorporates in its entirety all the disclosures of U.S. Patent Application US20110258443 filed on Jul. 23, 2010 and titled "User authentication in a tag-based service."

A geofence is a virtual perimeter for a real-world geographic area. A geofence can be dynamically generated as in a radius around a point location. A geofence can also be a predefined set of boundaries connecting points expressed by latitude and longitude, like school attendance zones or neighborhood boundaries. Geofencing has been made possible especially by the introduction of GPS (Global Positioning System) technology and the miniaturization of electronic components that have made the locationing functionality a standard feature in Mobile Phones and portable electronics in general (User Equipment).

In some enactments, geofencing is used for security purposes for example to provide security to wireless local area networks. In some other applications, when a location-aware device in a location-based service (LBS) enters or exits a geofence the device may receive a generated warning. This notice might contain information about the location of the device. The geofence notice might be sent to a mobile telephone, an email account, or a web site. Geofencing, when used with child location services, can alert parents when a child leaves a selected area. In other implementations, geofencing allows users of the system to draw zones around places of work, customer's sites and secure areas. The crossing of these geofences by an equipped vehicle can trigger a notification to a user or operator via SMS, Email or any other digital indication. The zones can also be linked to equipment within a vehicle and such equipment can stop a vehicle's engine.

Geofences or areas in general can be defined not only by means of GPS positioning but also by many other different techniques. For example, the range of a radio communication link type employed by an Access Point or a Base Station could be a way to define the perimeter of an area. The gradient of radio signal strength could be used for defining different and overlapping concentrically situated zones. Furthermore, the radio link employed by Access Point or Base Station could be of many different types, e.g. Wi-Fi, GSM, WCDMA, LTE, CDMA, RF-ID and Bluetooth, just to cite a few non-limiting examples. The person skilled in the art will understand that geofences can have many different shapes and be defined by means of many different techniques.

Location can be provided by many different techniques, for example triangulation with different Access Points or cellular Base Stations or signal strength data from various Access Point/Base Stations coupled with databases storing the location of various reference points.

For the purpose of the present application, the terms "2-D barcode", "2D barcode", "matrix barcode" or "optical codes" are synonymous and generally refer to a two dimensional barcode with encoded information that a scanner may read both horizontally and vertically. There are a variety of different 2D barcodes including, but not limited to Quick Response Codes (hereinafter "QR code"), Data Matrix codes, Aztec codes, MaxiCode, Semacode tags, Cauzin Softstrip codes, EZcode, High Capacity Color Barcode (HCCB), CyberCode, Mobile Multi-Coloured Composite (MMCC), Dot codes, PDF417 symbols, ShotCode, SPARQCode, WaterCode, Trusted Paper Key (TPK), and the like.

One of the most popular 2D barcode is the QR code (Quick Response). It is a matrix code created by Japanese corporation Denso-Wave. It is a two-dimensional bar code that can store data, such as plain text, mobile telephone numbers along with a SMS message, contact cards (e.g. VCards), geographic information, images and other information. Its original purpose was to track vehicles during manufacture. It was designed to allow high-speed component scanning Although initially used for tracking parts in vehicle manufacturing, QR codes are now used in commercial and personal applications with mobile-phone users. Many 2D barcodes have been optimized for use with smart phones so that they can be read quickly and accurately.

QR codes became an international standard in June 2000: ISO/IEC18004. They were also approved by GS1, an international standardization organization, as a standard for mobile phones in December 2011. The content of these standards is hereby incorporated by reference.

In some implementations, QR codes storing addresses and Uniform Resource Locators (URLs) may appear in magazines, on business cards, documents, or on almost any object about which users might want information. Users with a Smartphone equipped with the correct reader application can scan the image of the QR code to display text, contact information, connect to a wireless network, or open a web page in the telephone's browser. QR codes can be linked to a location to track where a code has been scanned. Either the application that scans the QR code retrieves the geo information by using GPS and cell tower triangulation (aGPS) or the URL encoded in the QR code itself is associated with a location.

Static QR codes, the most common type, are typically used to disseminate information to the public. They are frequently displayed in advertising materials, on television and in newspapers and magazines. A code's administrator can track information about the number of times a code was scanned and the associated action that have been taken, along with the times of scans and the operating system of the devices that scanned it.

While in a static QR code, the destination URL is placed into the QR code and cannot be altered, a dynamic QR code offers more functionality. The owner can edit the information associated with the QR code. For example, the owner of the code can modify the web address to which the QR code is pointing. Such codes can track more specific information, including the scanner's name and email address, how many times they scanned the code and, in conjunction with tracking codes on a website, conversion rates. In a Dynamic QR Code, a short URL is placed into a QR code that then transparently re-directs the user to the intended destination website URL. The short URL redirection destination URL can be changed after the QR code has been created.

Some 2D barcodes may contain information in an encrypted form. One cryptographic technique is known as the public key cryptographic system. One particular form of such a system is fully described and discussed in the basic article entitled "A Method for Obtaining Digital Signatures and Public Key Cryptosystems" by R. L. Rivest, A. Shamir and L. Adelmann, Volume 21 #2, February 1978, Communications of ACM pages 120-126. This system is referred to as the RSA public key cryptosystem.

Public key techniques, as described in the article "Public Key Cryptography" by John Smith, in the January 1983 edition of Byte Magazine, pages 189-218, include two different kinds of keys: encryption keys and decryption keys. These keys includes the properties that: (a) it is possible to compute a pair of keys including an encryption key and a decryption key; (b) such that, for each pair, the decryption key that is not the same as the encryption key; and (c) it is not feasible to compute the decryption key even from the knowledge of the encryption key. The name "public key" is derived from the fact that each party's encryption key is available to all parties subscribing to the particular public key network involved. Public key cryptographic systems are designed for the direct communication between any two subscribing parties, each party having an unpublished decryption key and a published encryption key. With public-key encryption, a message is encrypted with a recipient's public key. The message cannot be decrypted by anyone else who does not possess the matching private key. The owner of the private key is uniquely associated with the public key.

The public key cryptographic system has also found use in providing accurate identification of the source of a document. A sender can sign a message by first encrypt the message, or an authenticating portion thereof, such as, for example, the name of the sender using the private decryption key of the sender and then encrypt the message with the public encryption key of the receiving party. The outcome is a portion of the message that only an authorized sender could have created and only an authorized receiver can read.

With digital signatures, a message is signed with the sender's private key and can be verified by anyone who has access to the public key of the sender. This verification proves that the sender had access to the private key, and therefore is likely to be the person associated with the public key. This ensures that the message has not been tampered with, as any manipulation of the message will result in changes to the encoded message summary, which otherwise remains unchanged between the sender and receiver.

Throughout history, one of the tasks undertaken by many people and organizations has been proving the authenticity of documents or objects especially in times when many technologies offer the opportunity for forgeries. In certain implementations, certain documents are associated with tangible or intangible objects, for example artwork. Some artists use certificates of authenticity as means to prove authenticity of their artworks. The certificates may contain information such as title, medium, date, signature or other attributes that can make a buyer comfortable with buying an artwork. Paradoxically in the world of art, a certificate of authenticity may sometimes be regarded as more valuable than the artwork itself, since an artwork without its accompanying certificate may lose most of its value.

A certificate of authenticity is a document that an art collector can hold onto and is proof of an artwork's genuineness. There is no rule that says that artists have to produce certificates of authenticity, but they do add a layer of value and trust for an artist. They also make artworks easier to exchange over the art market.

Many techniques have been disclosed to prove the authentication of documents that may serve the purpose of furthering business transactions. For example, patent application "System and method for verifying authenticity of documents," U.S. 20130247218 A1, published on Sep. 19, 2013, includes incorporating a machine-readable code such as a QR code to a document, storing useful information that assists in verifying the authenticity on a secure document verification system. The machine code, which may contain a secure uniform resource locator (URL), optionally along with other information regarding the document, can then be scanned by a reader such as a camera attached to a computing device, for example a smart-phone; the computing device would then, on extracting the URL, redirect to the secure document verification system which then reveals the document or relevant information regarding the document, which accordingly verifies the authenticity of the document. The teachings of this application are hereby incorporated by reference.

Some techniques have been disclosed where the possibility of acceptance of a business offers has been restricted to a predetermined area. For example, patent application U.S. 20140019246, "Method and Apparatus for Location Based Conditional Offers", of the same inventor as the present application, filed on Jul. 13, 2012, limits the possibility of acceptance of a business offer to a predetermined area.

The detailed description of the drawings that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment; including remote file servers, computer servers, publishing resources, and/or memory storage devices.

Most services in a heterogeneous distributed computing environment can be grouped into one of these major categories: distributed file system, distributed computing resources, and messaging. A distributed file system provides a client with transparent access to part of the mass storage of a remote network device, such as a server. Distributed computing resources provide a client with access to computational or processing power of remote network devices, such as a cloud server.

Reference is made in detail to the description of the embodiments as illustrated in the drawings. Particular embodiments described in this application provide specific case implementations of document authentication by scanning 2D barcode labels affixed to a particular document. While embodiments are described in connection with the drawings and related descriptions, there is no intent to limit the scope to the embodiments disclosed herein. On the contrary, the intent is to cover all alternatives, modifications, and equivalents.

The present invention draws synergies and advantageously adds to the above-mentioned technologies, concepts and observations providing a method, a system and an apparatus to, e.g., improve customary methods of authenticating documents and/or items, and/or furthering business transactions and/or enabling secure functionalities associated to documents and/or items.

SUMMARY

Various aspects of examples of the invention are set out in the claims.

According to a first aspect of the present invention, a method comprises at least 1) receiving indicia of the optical capturing of an optical code by a user equipment; 2) receiving a location data associated with said optical capturing from said user equipment; 3) comparing said location data with a location of record for said optical code; and 4) as a result of said comparison enabling a predetermined functionality.

According to a second aspect of the present invention, an apparatus comprises least one processor and one memory containing software code configured to cause the apparatus to perform at least the following: 1) receiving indicia of the optical capturing of an optical code by a user equipment; 2) receiving a location data associated with said optical capturing from said user equipment; 3) comparing said location data with a location of record for said optical code; and 4) as a result of said comparison enabling a predetermined functionality.

According to a third aspect of the present invention, a computer software system has a set of instructions for controlling at least one general-purpose digital computer in performing desired functions comprising a set of instructions formed into each of a plurality of modules, each modules comprising 1) a process for receiving indicia of the optical capturing of an optical code by a user equipment; 2) a process for receiving a location data associated with said optical capturing from said user equipment; 3) a process for comparing said location data with a location of record for said optical code; and 4) a process for enabling a predetermined functionality as a result of said comparison.

BRIEF DESCRIPTION OF THE DRAWINGS

For a more complete understanding of example embodiments of the present invention, reference is now made to the following descriptions taken in connection with the accompanying drawings in which.

GLOSSARY

Figure 1:
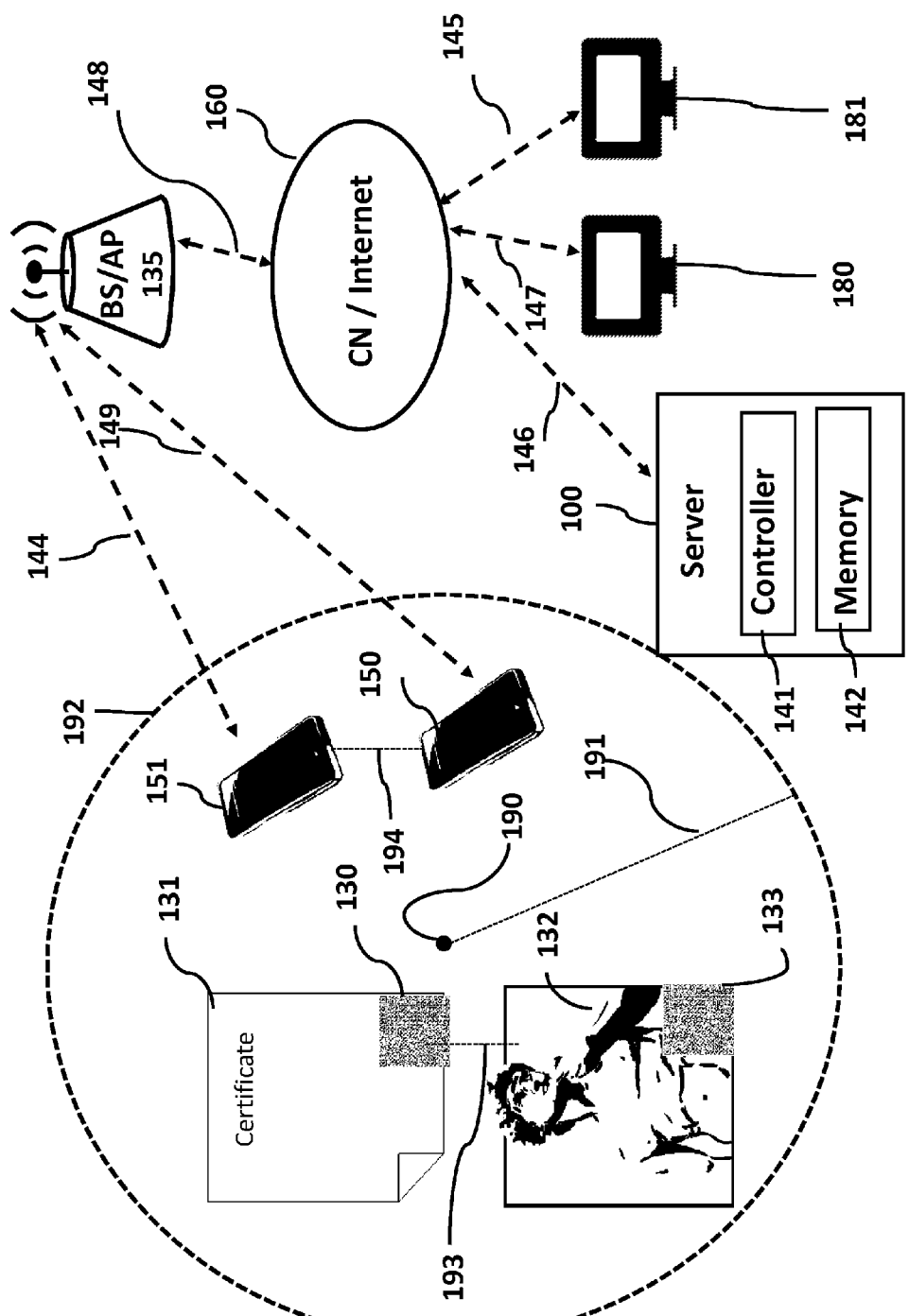
FIG. 1 represents one possible system embodiment of the invention in which a certificate and an object are located within a location area.

First optical scanning—the capturing of an image and/or the scanning by means of light beams to scan and/or digitally convert images, codes, text or objects such as two-dimensional (2D) digital files by an input device such as a smart phone or dedicated equipment. The conversion of an image into data may occur at the image-capturing device or, at least in part, at a remote server. The adjective "first" does not have a chronological or sequential connotation but it is rather used to distinguish actions, functions or objects from a "second" or "third."

Second optical scanning—the capturing of an image and/or the scanning by means of light beams to scan and/or digitally convert images, codes, text or objects such as two-dimensional (2D) digital files by an input device such as a smart phone or a dedicated equipment. The conversion of an image into data may occur at the image-capturing device or, at least in part, at a remote server. The adjective "second" does not have a chronological or sequential connotation but it is rather used to distinguish actions, functions or objects from a "first" or "third."

Predetermined functionality—a functionality that is associated with said optical code such as, e.g., the verification of a document or an object, or a transaction of ownership of a document or an object, or the acquisition of certain rights, even temporarily over a document or an object, or the enabling of functionalities related to an object.

Location of record—it is generally associated with a geographical point and a surrounding area to account and compensate for inaccuracy in estimating a location data by equipment in general. In some implementations, a location of record could be associated with a means of transportation that is moving and therefore said location of record could be anchored to said means and be dynamic. User equipment may determine, e.g., its position by 'receiving" the ID of a Wi-Fi access point installed on a train. A location of record does not exclude the possibility of a plurality of locations of record for the same optical code.

Authority of record—a person or an organization having a right or an obligation to control, certify or regulate ownership, functionalities, authenticity of objects or documents associated with an optical code. As non-limiting examples, an authority of record could be an owner, a prospective buyer, a certification authority, or a lessee or lessor of an object.

Attribute of record—a reference attribute that is usually remotely and securely stored and can be used for comparison with the capturing or measuring of said attribute in association, e.g., with said optical scanning for enabling a predetermined functionality. In certain implementations, said attribute of record can be downloaded and, at least temporarily, stored by user equipment.

Time based attribute—an attribute related to time such as a time snapshot, a time window or a time interval between two occurrences.

Digital image based attribute—an attribute related to a digital image data. For example, during the image acquisition or scanning of an optical code, user equipment may capture an area surrounding an optical code of an object or a document. For example, if an optical code is attached to a document, the analysis of an area on the document surrounding the optical code can be used to corroborate the validation of the authenticity of said document.

Magnetic field based attribute—an attribute related to a magnetic data. For example, during the image acquisition or scanning of an optical code, user equipment may capture a magnetic data representative of the instantaneous orientation or position of said user equipment. In addition, since a magnetic field is susceptible to nearby metal infrastructure, the magnetic field surrounding objects may leave a magnetic footprint that can be used for comparison with measurements of record.

Spatial orientation based attribute—an attribute related to orientation. For example, during the image acquisition or scanning of an optical code, user equipment may capture via a gyroscope a data representative of the instantaneous orientation of said user equipment.

Altitude based attribute—an attribute related to altitude. For example, during the image acquisition or scanning of an optical code, user equipment may capture via an altimeter, a data representative of the instantaneous altitude, of said user equipment. The altimeter can be based on a barometer altimeter, GPS or other.

Acoustic based attribute—an attribute related to sound. For example, during the image acquisition or scanning of an optical code, user equipment may capture via a microphone a data representative of the instantaneous acoustic background environment of said user equipment.

Lenticular printing—a technology in which lenticular lenses are used to produce printed images with an illusion of depth, or the ability to change or move as the image is viewed from different angles. Examples of lenticular printing include animation effects and modern advertising graphics that change their message depending on the viewing angle. In certain implementations, lenticular technology may force user equipment to read, capture, or scan an optical code only from certain angles, e.g., a frontal angle.

DETAILED DESCRIPTION OF THE DRAWINGS

An example embodiment of the present invention and its potential advantages are understood by referring to FIGS. 1 through 5 of the drawings.

FIG. 1 describes an exemplary embodiment of the invention wherein User Equipment (UE) 151 may belong to an owner of a document to be authenticated and/or sold, Certificate 131. UE 150 may belong to the beneficiary of said authentication or transaction of said Certificate 131. In some implementations, appended to said Certificate 131 there is an optical code, for example QR 130. The person skilled in the art will appreciate that two-dimensional codes are just an example and the invention can be implemented via other kind of codes such as one-dimensional codes or even RF-IDs. As a simplification, and for uniformity, the present application will often refer to QR codes but any product of any technology known to the person skilled in the art that can be implanted in paper certificates and/or artworks providing identification, whether optical or based on radio waves can be used for many of the implementation herein disclosed.

In some implementations, UE 151 and UE 150 could be running a software application apt to facilitate the pairing of said UE with a user and the execution of functionalities associated with said QR code. In addition, login and a password can be used to access said software application running on mobile equipment. This can make UE 151 or UE 150 and equipment in general interchangeable among users. The person skilled in the art will understand that many methods exist to associate a user with a UE. For example, fingerprints optical reading or a password. Any secure association, generally known to the person skilled in the art, of a user with UE is to be considered within the scope of the present application.

In one exemplary implementation, Certificate 131 has an optical code QR 130 attached, appended, or incorporated. Object 132 can be, e.g., an art piece and is authenticated by Certificate 131. Object 132 can be marked, e.g., with another optical code such as QR 133. In some implementations, QR 130 and QR 133 are linked or associated with each other via data entries stored into Memory 142 of Server 100.

Links 149, 148, 147, 146, 145, 144 do represent links or connections capable of transporting digital information from and to Server 100, UE 150, UE 151, Owner Equipment 180 and Admin Equipment 181. Core Network/Internet 160 represents hardware including but not limited to wireless radios repeaters, cables, core network infrastructure and hardware or any other equipment capable of implementing Telecom standards or connecting various physical layers or routing information. For the sake of brevity, the detailed description of the telecommunication and core network equipment will been omitted but the person skilled in the art will be able to retrieve detailed and enabling descriptions of the related telecommunication technologies by using, for example, one of the many telecommunications standards specifications available from standardization bodies such as TIA, ETSI or IEEE.

BS/AP 135 represents a base station or an access point capable of connecting wirelessly with portable user equipment such as UE 151 and 150.

Server 100 may contain in Memory 142 software applications and datagrams apt to record and store at least four categories of data. These categories are:

1) Associations between QR codes and attributes related to said codes. For example, QR 130 can be linked to QR 133 and certain functionalities can rely on or exploit said association.

2) Attributes related to objects (e.g., artwork) such as Object 132 or certificates, such as Certificate 131, to which such codes (QR 130 and QR 133), have been appended, attached or embedded and their surrounding environment or record.

3) Decryption and encryption keys, locations and/or conditions for the authentication and/or operation of said codes QR 130 and QR 133 attached or embedded into said Certificate 131 or Object 132.

4) Descriptions and/or attributes of said Certificate 131 and/or Object 132 that can be retrieved by UE 151 and/or UE 150 via Link 144 and link 149. Examples of these attributes can be, for example, a digital picture of Certificate 131 or Object 132, or information related to said items such as their history, previous owners, identifying data, authentication authorities and more.

Server 100 may also comprise at least one Controller 141. Memory 142 may also host computer code and at least one algorithm to be executed by means of said Controller 141 that is configured to perform the instructions that will produce, e.g., an authentication of said Certificate 131 and/or Object 132 via QR 130 and/or QR 133, alone or in combination.

In one exemplary implementation, UE 150 that is owned, e.g., by a potential buyer of Object 132, needs to authenticate Certificate 131 that has embedded QR 130. In this implementation, QR 130 is located within a circular area centered on Location 190 having a radius Radius 191. Again, the person skilled in the art will understand that this is just one example and a geofence can have many different shapes or can be implemented by means of many different technologies: GPS, Radio Horizon centered on an emitting object, or other many positioning technologies that are commonly known by a person skilled in the art such as, e.g., the mapping of RF-ID readers.

In one implementation related to the authentication of Certificate 131, UE 150 may scan QR 130 via its Camera 482 and may send the data related to QR 130 and its position to Server 100. Controller 141, via an algorithm and data contained in Memory 142, may compare the position data received by UE 150 with a reference position data stored in Memory 142, e.g., Location 190. If these two position data are within a certain range, namely Radius 191 an authentication is possible.

A reference position data, Location 190, in a certain implementations, is the location of record of said QR 130. For example, the owner of the original Certificate 131 may impose that its location of record be Location 190 and that said certificate can only be authenticated (or sold) within a predetermined distance from said location of record. A location of record Location 190 is possible for both Certificate 131 and Object 132.

Said location of record, Location 190, stored in Memory 142, can be determined and inputted in at least three ways. In a first implementation, the legitimate owner of Certificate 131 also owns UE 151 with which he has logged in with his owner credentials. By scanning the code QR 130 with Camera 482 of UE 151, owner of Certificate 131, and possibly of Object 132, may send the location of UE 151, and consequently of Certificate 131, to Memory 142 via Links 144, 148, 146. This new scan of a legitimate owner of Certificate 131 may have the result of updating the location of record of said Certificate 131. The same, example can be done in regard to Object 132.

In another implementation, Location 190, that is associated with QR 130, can be recorded in Memory 142 manually via Owner Equipment 180. Owner Equipment 180 could be, e.g., a laptop or a desktop that allows certain functionalities associated with ownership of Certificate 131 and/or Object 132. Owner Equipment 180, in certain implementations, could be a connected device that can be accessed via login functionality by the legitimate owner and can be running a web application that is interfacing with Server 100.

In another implementation, Location 190 can be recorded in Memory 142 via an Admin Equipment 181. The administrators of the authentication service could operate Admin Equipment 181. The administrators could be the owners of an authentication and/or ownership transaction service for certificates or art works. There is no strict need for ownership of the equipment as a web application running on connected equipment can be used to access Server 100.

The person skilled in the art will understand that one of the outcomes of the scanning of QR 130 within Area 192 could be the retrieval of information related to Certificate 131 and/or Object 132 associated with Certificate 131. For example, a copy of the certificate may appear on the screen of UE 151 so that Certificate 131 can be compared with what is represented via I/O User Interface 450 of UE 151 or UE 150, e.g., a screen. A comparison between the visual distinctiveness of Certificate 131 and its representation on the screen may support the authenticity of the document.

In one implementation, only owners of Object 132 and/or Certificate 131 will be able to define Location 190 so that the location of record for the tangible copy of Certificate 131 and/or Object 132 to which QR 130 or QR 133 have been appended is unknown to anybody else but the legitimate owner of Certificate and/or Object 132 and/or an authority administrator of a service.

In one implementation, illicit reproductions of QR 130 or QR 133 and their appending to illicit reproductions of Certificate 131 or Object 132 may result in a denial of authentication from Server 100 when those codes are scanned outside Area 192.

In some implementations, it may not matter that a false QR 130 or a false QR 133 has been perfectly reproduced. If those codes are optically scanned outside of Area 192, authentication or a change of ownership of a certificate or an object can be negated by an algorithm running on Server 100. In another implementation, the system may alert the police or other authorities, under certain circumstances if the location or QR 130 and/or QR 133 and/or Certificate 131 and/or Object 132 are reported outside Area 192 in a tentative to authenticate or transfer ownership of Object 132 or Certificate 131. Owners and legitimate administrators of certificates and associated objects (e.g., artwork) may be able control the location of record for those items via Owner Equipment 180 or Admin Equipment 181. In one implementation, an optical scanning outside area 192 may trigger denials of authentication, flags or warnings.

The possible scenarios are numerous. For example, the owner of Object 132 (artwork) wants to sell to a buyer. A prospective buyer may request Certificate 131 to attest the authenticity of Object 132 beforehand. Owner of both Certificate 131 and Object 132 may send, via traditional mail, Certificate 131 to said prospective buyer. In one embodiment, owner may update the location of record of Certificate 131 and make it correspond to the address where Certificate 131 has been shipped so that only a user of UE 151 who scans Certificate 131 within Area 192 that is centered on the new location of record will be able to authenticate the document. One possible advantage is that, if the certificate is lost or stolen, a query to Server 100 from outside an authorized zone may result in a denied authentication.

The same example as above can be made for Object 132. If QR 133 is scanned outside an authorized zone, an authentication or a change of ownership could be denied.

In some implementations, QR 130 and QR 133 are linked together. For example, data pertaining to Certificate 131 and Object 132 could be retrieved only if QR 130 and QR 133 are scanned sequentially within a predetermined time window. In another implementation, the scanning of QR 130 and QR 133 may allow the retrieval of data only if the positions of UE 151 or UE 150 during the sequential scanning of said codes comply with certain positioning requirements. For example, QR 130 and QR 133, when scanned, should be associated with a location reported by either UE 151 or UE 150 that is within Area 192 for certain functionalities to be enabled. In another embodiment, QR 130 and QR 133 when scanned sequentially should be associated with positions that are reported by User Equipment UE 151 and/or 150 that are within a certain predetermined Range 193 from each other.

The person skilled in the art will understand that often, for practical purposes Range 193 that indicates a distance value between QR 130 and QR 133 is an approximation of a distance, Range 194, between UE 151 and UE 150 especially if during the scanning of QR 130 and QR 133 by UE 151 and UE 150 a time window constrain is implemented.

Figure 2:
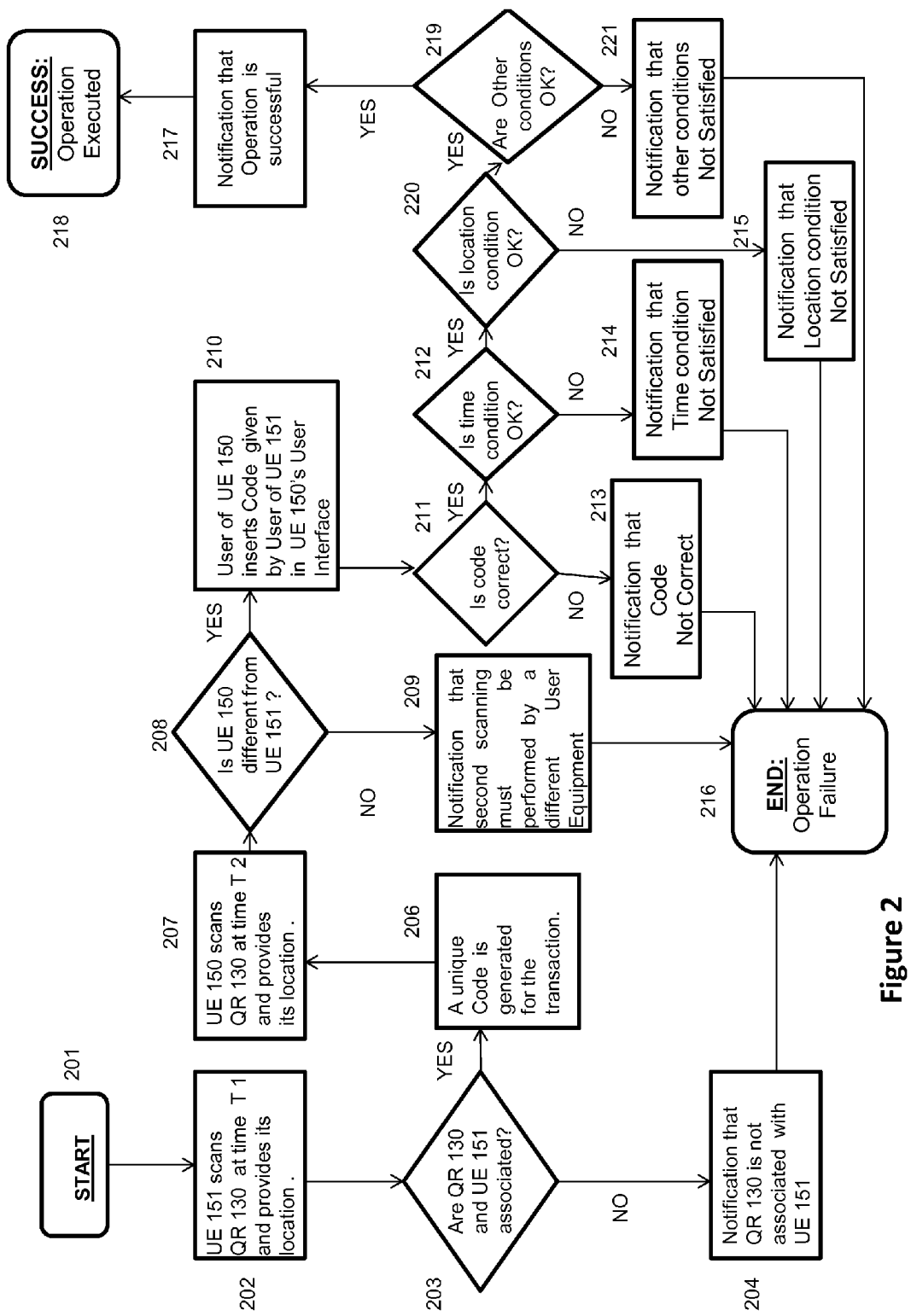
FIG. 2 represents a general flow diagram showing a possible embodiment wherein attributes related to an optical code that are securely stored and accessed remotely are used to regulate the execution of a functionality associated with said optical code.

FIG. 2 describes an exemplary process flow for an authentication of Certificate 131 that is owned by user of UE 151 for the benefit of a potential buyer of the certificate and/or the associated Object 133, e.g., user of UE 150. The person skilled in the art will understand that a similar process can be used in the case of a transfer of ownership. An exemplary process flow may have this structure:

UE 151 scans QR 130 at time T1 and provides its location to Server 100; (202) Controller 141 may assess if QR 130 and UE 151 have been associated by, e.g., a service administrator; (203)

If QR 130 and UE 151 are not associated, a notification that QR 130 is not associated with UE 151 is generated by Server 100; (204) and Operation Fails (216);

If QR 130 and UE 151 are associated, a Unique Code is generated, sent to UE 151, and represented by I/O User Interface 450, (206);

UE 150 scans QR 130 at time T2 and provides its location to Server 100; (207) Controller 141 may assess if UE 150 and UE 151 are two different apparatuses; (208);

If UE 150 and UE 151 are not two different apparatuses a notification is sent to UE 150 that the optical scanning must occur with a different apparatus; (209) and Operation Fails; (216)

If UE 150 and UE 151 are two different apparatuses a user of UE 150 may insert said Unique Code into UE 150 via its user interface I/O User Interface 450 (provided that user of UE 151 has communicated said Unique Code to user of UE 150); (210)

Said Unique Code is sent to Server 100 and Controller 141 may assess if said Unique Code is the same that was sent to UE 151; (211)

If said Unique Code that has been inputted via UE 150 is not correct, Server 100 generates a notification to UE 150; (213) and Operation Fails; (216)

If the Unique Code is correct, Controller 141 may further assess if said reception of said Unique Code satisfies a predefined time condition; (212)

Said predefined time condition could be a time difference between T2 and T1, namely, for the time condition to be satisfied, UE 151 and UE 150 must sequentially scan QR 130 within a predetermined interval from each other for the operation of authentication to be successful. In another implementation, either the scanning of QR 130 by UE 151 and/or UE 150 should occur within a predetermined time window. For example, user of UE 150 and user of UE 151 should scan QR 130 within a certain time interval from each other for said time condition to be satisfied. In another implementation, user of UE 150 should input and communicate said Unique Code to Server 100 within a certain time window. The person skilled in the art will understand that the possible variations about time conditions are very numerous and may refer to different triggering events such as the scanning of the optical code, or the inputting of a code, or the meeting of antecedent conditions. The few examples provided are just samples.

If said time condition, as defined and stored in Server 100, is not satisfied, Controller 141 may generate a notification to UE 150; (214) and Operation Fails; (216).

If the precedent time condition is satisfied, Controller 141 may move to assess if a location condition is satisfied; (220). Said location condition could be, for example, that when UE 150 performs an optical scanning of QR 130, UE 150 be located within Area 192. In another embodiment, said predefined location condition could be that, when UE 150 communicates said Unique Code UE 150, it must be located within Area 192. In some implementations, Area 192 could be far away from the location of the first scanning of QR 130 by UE 151. For example, after the initial scanning of UE 151 and the generation of said Unique Code, the legitimate owner of Certificate 131 and user of UE 151 could mail Certificate 131 to the home address of user of UE 150. In one implementation, said predefined location condition could be such that to authenticate said Certificate 131, UE 150 should be located within an area centered on said home address; Location 190 may coincide with said home address of said prospective buyer. The location of UE 150 could be reported to Server 100 either at the time of scanning of QR 131 or at the time of communicating said Unique Code to Server 100.

In another implementation, said location condition could be that the distance Range 194 between UE 151 and UE 150 be under a certain threshold during their scanning of the QR codes or during the reception or inputting of said Unique Code.

In another implementation, QR 133 and QR 130 are linked to each other and, for example, Location 190 may coincide with the location of Object 132. In some implementations, the sequential optical scanning by UE 151 and by UE 150 of, e.g. QR 130, within a certain period and within a certain distance threshold, Range 194, could be a condition necessary to authenticate or transfer ownership of Certificate 131 and/or Object 132.

Figure 3:
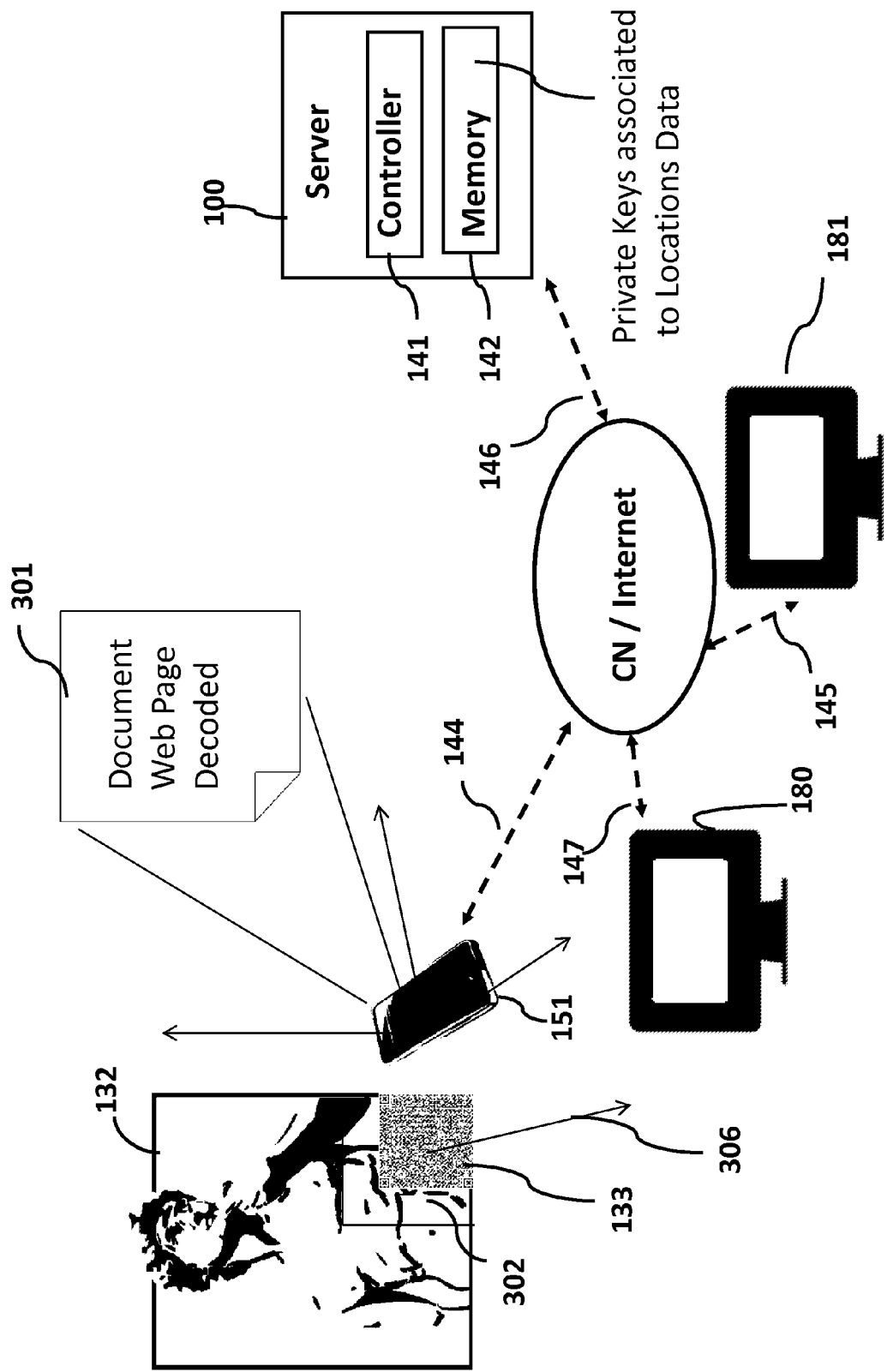
FIG. 3 represents a possible embodiment wherein certain attributes associated to an optical code are explained in more detail.

In some implementations, certain "other conditions" could be stored in Memory 142 that are related to QR 130 or QR 133. As it will be discussed with reference to FIG. 3 and FIG. 4, user equipment UE 151 or UE 150 can contain an array of sensors that may aid in validating said "other conditions". For example, Camera 482 could be used not only to scan an optical code but also to capture an Optical Area 302 surrounding said QR 133 as represented in FIG. 3. If QR 133 is attached to an artwork, e.g. Object 132, the surrounding area of QR 133, Optical Area 302, can be used to match sample images of the original artwork and validate the optical code using techniques similar to optical fingerprinting. The same technique can be applied also to Certificate 131.

In another implementation, one "other" condition may consist in attributes that can be verified by using Compass 476 and/or Gyroscope 481. If for example, as represented in FIG. 3, QR 133 is securely attached to Object 132, UE 151 must be oriented in a predetermined manner to perform an optical scanning of QR 133. Said requirement can be made more stringent if QR 133 uses, e.g., lenticular printing technology wherein, for example, a valid scanning of QR 133 can be obtained only by placing Camera 482 perpendicular to Axis 306 in FIG. 3. Lenticular technology uses lenticular lenses (a technology that is also often used for 3D displays) to produce printed images with an illusion of depth, or the ability to change or move as the image is viewed from different angles. In one lenticular technology implementation, a QR code can be scanned only from a predetermined frontal angle that will be forcing UE 151 to be oriented according to a predetermined orientation of record stored in Memory 142. If an orientation of record of QR 133 is stored in Memory 142, said orientation of record can be used for comparison during the optical scanning of QR 133 by user equipment with the actual orientation of said user equipment. In certain implementations, only if the orientation of record and the orientation of user equipment during the optical scanning are within a certain error range the condition is satisfied. This implementation can be used, for example, when QR codes are attached to fixtures or objects that are not moved often such as a statue or a painting. In another implementation, the QR code will change according to the angle of view so that the scanning of the code may actually comprise multiple scanning that can be associated with multiple readings of the orientation of UE. In another implementation, the orientation of record can change according to patterns that are known only to a legitimate owner or administrator. For example, the orientation of record could be the azimuth or the direction of a moving planet or a star at a particular location.

In other implementations, Altimeter 478 may also contribute to provide a reading of altitude during the scanning of a QR code that can be compared with an altitude of record for said QR code that is stored within Memory 142.

The person skilled in the art will understand that the examples are numerous and any sensor that can be embedded within User Equipment 151 or 150 can be used to generate a data value during an optical scanning that can be compared with a condition of record stored in Memory 142. For example, to authenticate a QR code, an administrator or an owner having authority over said QR code could impose that a certain music or title to be played in the background so that a microphone incorporated in I/O User Interface 450 can perceive said music. UE may send a sample of the acoustic ambiance to Server 100 wherein Controller 141 can compare it with an ambiance of record for said QR code.

The person skilled in the art will understand that an algorithm running on Server 100 may use multiple arrays of data coming from readings of sensors of UE that are associated with the scanning of a QR code. As long as at least a certain number of conditions are met, Controller 141 may allow an authentication or an ownership transaction. In certain implementations, an algorithm running on Server 100 in charge of selectively enabling functionalities associated with, e.g., QR codes such as ownership transactions, certifications or other functions, may employ weights so that certain conditions may be more stringent or important than others. For example, if a score generated by compounding the meeting of a plurality of conditions is above a predetermined threshold, an operation of authentication, sale, or function enablement associated with an object or certificate could be successful. For example, in certain implementations, the meeting of a location condition could be condition necessary for an authentication. In another implementation, an authentication may require more than the meeting of a location condition. For example, it may be necessary that a particular orientation of a UE during the scanning of the QR be recorded, sent to Server 100 and compared to an orientation of record. If multiple ambiance measurements are collected and sent to Server 100, a score can be generated and compared with a score of record to assess how well those multiple measurements match conditions of record. If all or part of "other conditions" has been satisfied, a notification is sent that operation has been successful (217), and an operation associated with said conditions is executed. (218).

In some implementations, the block "other conditions" 219 may not exist. In an exemplary implementation, 1) if a Unique Code is received correctly from UE 150 and, 2) a time condition is satisfied, and 3) a location condition is satisfied, then a notification is sent from Server 100 to either UE 150 and/or UE 151 that the operation of authentication of Certificate 130 has been successful (217). The person skilled in the art will understand that similar procedures can be used to either transfer ownership of Certificate 131 and/or Object 132 or authenticate Certificate 131 and/or Object 132.

In another implementation if one of the "other conditions" is not satisfied, a notification that "other conditions" (as an aggregate score or in particular) has not been satisfied can be generated and sent to a UE; 221.

The person skilled in the art will understand that not all the blocks are necessary. For example, some of blocks 208, 211, 212, 220, 219 could be missing in certain implementations.

FIG. 3 is a simplified representation of a particular embodiment wherein a QR code, for example QR 133 associated with Object 132, is encrypted with a public key PuK1. In one implementation, a mobile application running on UE 151 may send to Server 100, via Link 144, said optical scanning simultaneously with a value location L1 representing where UE 151 has scanned said QR 133. In one implementation, Controller 141 may look over a datagram in Memory 142 containing associations of locations with private keys. For example, if location L1 is contained in said datagram in Memory 142, private key PrK1, that is associated with said location L1 and is also associated with PuK1, can be used to decrypt the scanned image of QR 133. In some implementations, QR 133 may contain, at least partially, a short URL that has been encrypted using PuK1.

In some implementations, the short URL may be dynamic. The person skilled in the art knows that there are two types of URLs: dynamic and static. A dynamic URL is a page address that results from the search of a database-driven web site or the URL of a web site that runs a script. In contrast to static URLs, in which the contents of the web page stay the same unless the changes are hard-coded into the HTML, dynamic URLs are generated from specific queries to a site's database. The dynamic page is often a template in which to display the results of the database query. Instead of changing data in the HTML code, the data is changed in the database.

In one implementation, UE 151 may convey to Server 100 the image of QR 133 and its location without doing any processing on its end. In this implementation, a dynamic short URL is encoded in said QR 133. Once decrypted using the private key associated with location L1, Server 100 may return Web Page 301 with data and attributes related to Object 132 via Link 146 and Link 144 to UE 151. In this implementation, the QR code that has been scanned by UE 151 could be unusable by traditional and standardized QR code application readers.

In another implementation, QR codes could be coded multiple times. For example, an administrator could leave the external layer of the coding to a traditional QR coding technique that is compliant with QR encoding standards while encoding a payload with a proprietary public key such as PuK1.

The person skilled in the art will also understand that L1 is, in certain implementations, an equivalent for Location 190. As long as the location reported by UE 151 is within a certain radius from L1, Controller 141 may associate the QR code that has been encrypted with PuK1 with the correspondent private key PrK1 stored in memory 142.

Owner Equipment 180 and Admin Equipment 181 could be the only authorized to change the location of record of Object 132 and consequently of QR 133. As discussed this equipment is interchangeable if a web application is used.

Figure 4:
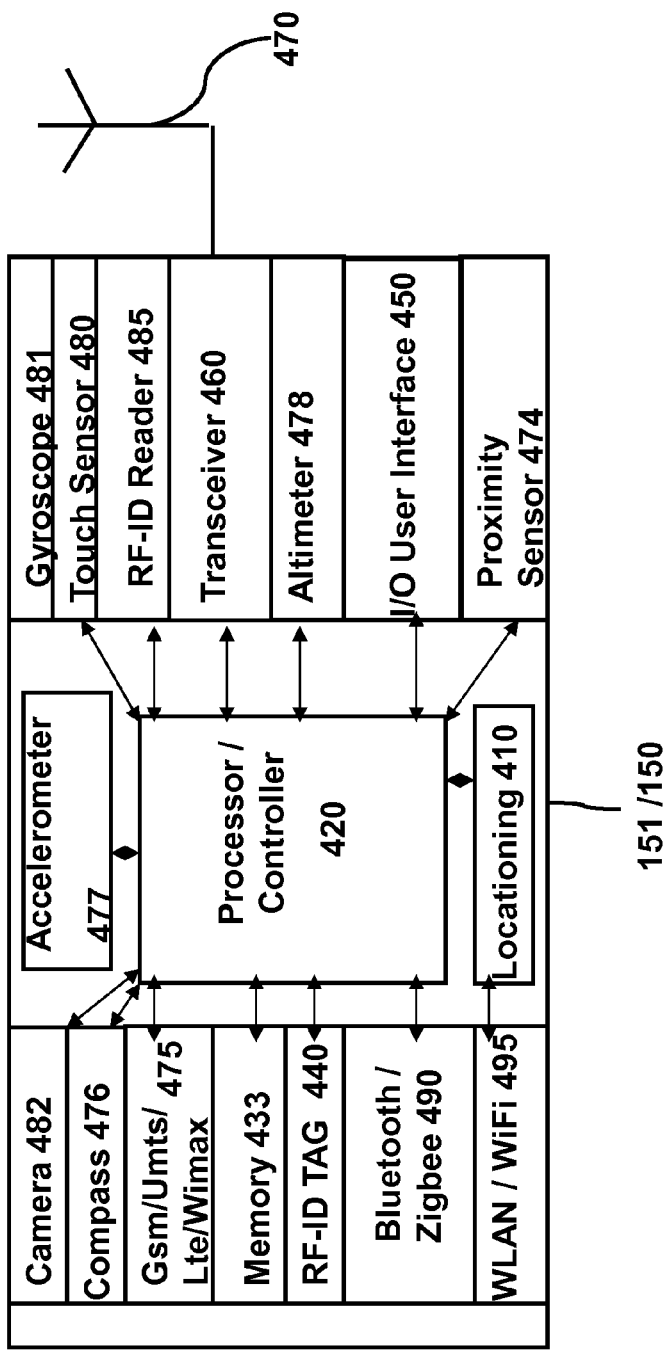
FIG. 4 represents a schematic representation of an embodiment of a User Equipment 151 or 150.

The person skilled in the art knows that a location can be spoofed by using certain software. However, if the integrity of the software application running on UE 151 is preserved, and UE 151 is legitimate equipment that is used by a prospective buyer and/or beneficiary of the authentication of Object 132, and the chain of custody is preserved, any gross mismatch between the location of record of QR 133 and the reported location of QR 133 may result in a denial of accessing the information associated with, e.g., an encrypted URL. Moreover, as it has been discussed with reference to FIG. 2 and will be further described with reference to FIG. 4, given the array of sensors that a UE may incorporate, "other conditions" associated to attributes of a QR code can be cross-referenced and validated in a comparison against the attributes of record for QR 133 stored in Memory 142. For example, as discussed with reference to FIG. 2, Axis 306 represents a vertical axis providing the optimal and perhaps only orientation, (if lenticular technology is used,) that may be useful for an optical scanning of QR 133 by UE 151. In fact, UE 151 must be oriented according to Axis 306 to capture the image of QR 133. As discussed the orientation of Axis 306 could be an attribute stored in Memory 142 to be used for comparison with values captured by UE 151. The person skilled in the art will understand that many of the observations discussed for Object 132 are valid also for Certificate 131.

FIG. 4 is a simplified representation of a particular embodiment of a UE 151 or 150. The person skilled in the art will understand that not all the modules that are described are necessary to implement every embodiment but rather different embodiments can be implemented by using only some of the modules described. The person skilled in the art will also understand that the modules in FIG. 4 are just representations of certain functions and that, for example, a Transmission Module GSM/UMTS/LTE/WiMAX 475 is generically representative of a wireless communication module independently from the physical layer, Mac layer, application layer, or underlying telecommunication standard or technology used.

In one implementation, UE 151 or UE 150 may support simultaneous transmissions of cellular (e.g., GSM/UMTS/LTE/WiMAX) and non-cellular (e.g., WLAN 495 or Bluetooth®/ZigBee 490) radio carriers. A TX/RX Module GSM/UMTS/LTE/WiMAX 475 could be the medium by which UE communicates with Server 100 via base stations and core network equipment. The person skilled in the art will understand that, with the progress of telecommunication technologies, the radio waves carrier types that can be employed to carry data by UE 151 and base station or access point BS/AP 135 will vary. For example, in some implementations, the communications among different modules of the system described in FIG. 1 may occur via visible light, sound, or other physical layers.

As discussed, FIG. 4 provides a schematic example of a UE 151 apparatus in accordance with one embodiment of the present invention wherein said UE is, e.g., a smart phone. FIG. 4 may also represent a personal digital assistant, a laptop computer, an e-book reader, an entertainment console or controller, wearable hardware, such as augmented reality headsets, a tablet computer or any other equivalent portable device that may be used to communicate with other mobile equipment or with Server 100.

UE 151 may include at least one Processor/Controller 420 and at least a Memory 433 comprising computer program instructions. The at least one Processor/Controller 420 can be embodied by any computational or data processing device, such as a central processing unit (CPU) or application specific integrated circuit (ASIC). The at least one Processor/Controller 420 can also be implemented as one or a plurality of controllers.

Memory 433 may contain application software running on UE 151. In one implementation, UE 151 can retrieve and store datagrams to expedite the system's performances according to various parameters such as location, time windows, user settings and preferences.

The at least one Memory 433 can be any suitable storage device, such as a non-transitory computer-readable medium. For example, a hard disk drive (HDD) or random access memory (RAM) can be used in the at least one Memory 433. The at least one Memory 433 can be on the same chip as the at least one Processor/Controller 420, or may be separate from the at least one Processor/Controller 420.

The computer program instructions may be any suitable form of computer program code. For example, the computer program instructions may be a compiled or interpreted computer program. The at least one Memory 433 and computer program instructions can be configured to, with the at least one Processor/Controller 420, to cause a hardware apparatus such as UE 151 to perform any process described herein.

UE 151 may also include an I/O User Interface 450. I/O User Interface 450 may allow inputting of information and data via a touch screen or a QWERTY keyboard or other methods described with reference to the description of previous figures. In one implementation, I/O User Interface 450 may also include, e.g., a vibrating notification module, a microphone, a speaker, a monitor or a screen to provide augmented reality functionalities or any combination thereof. UE 151 may include one or more Transceiver 460 configured to operate in conjunction with one or more Antenna 470 to communicate wirelessly.

In one embodiment, the Antenna Unit 470 may support beam forming and/or multiple input multiple output (MIMO) operations. As those skilled in the art know, MIMO operations may provide spatial diversity, which is to overcome difficult channel conditions and/or increase channel throughput. Antenna 470 may include antenna tuning and/or impedance matching components, RF power amplifiers, and/or low noise amplifiers. UE 151 can be optimized to support multiple transceivers using multiple wireless standards.

In one example embodiment, UE 151 may support simultaneous transmission of cellular (for example, GSM, UMTS, LTE, WiMAX) and non-cellular (for example, WLAN/Wi-Fi 495 or Bluetooth®/ZigBee 490) radio carriers. A Transmission Module GSM/UMTS/LTE/WiMAX 475 may allow UE 151 to communicate with Server 100.

The locationing component of the invention can be advantageously implemented in many different ways. In one possible implementation, Locationing 410 module, e.g. GPS, may provide the location of UE 151 to Server 100 via Link 146. GPS module capabilities can be augmented by data provided, for example, by Altimeter 478. When in closed environments, such as a shopping mall, the Locationing 410 module may use other technologies such as, e.g., choke points, grids, location indexing and presence reporting for RF-ID tagged objects.

As described in U.S. Pat. No. 5,594,448 titled "Highly Accurate RF-ID Positioning System", RF-ID TAG 440 can be interrogated by indoor RF-ID readers that have been strategically placed. Said choke point indoor positioning system based on RF-ID readers can be used in combination with Compass 476, Altimeter 478 and Accelerometer 477 to provide an accurate tracking of the position of UE 151 via inertial measurements within enclosed premises where a GPS module or other locationing systems may not work or be sufficiently precise. Other techniques used to provide the location data are angle of arrival, time of arrival and received signal strength indication. The literature in this field is vast.

Proximity Sensor 474 can be used to trigger or regulate the optical scanning via Camera 482. As discussed with reference to FIG. 1, FIG. 2 and FIG. 3 a location data can be associated to QR 133 and/or QR 130 to trigger or inhibit functionalities.

Compass 476, Gyroscope 481, and Altimeter 478 are part of the series of sensors that, as discussed with reference to previous figures, could contribute to validate QR codes or activate functionalities associated with those codes. For example, if QR 133 has been appended to Object 133 (a statue for example) and said object has not been moved, Compass 476 and Gyroscope 481 may read values related to orientation of UE 151 or UE 150 during the scanning process and compare said values to reference values associated with QR 133 that are stored in Memory 142. Those reference values, in one implementation, are under the sole control of the legitimate owner or administrator of the QR code (or the owner of the certificate or object to which the QR is appended). If QR 133 is attached to Object 133, the orientation of the scanning equipment (UE 151 or UE 150) while scanning QR 133 can be used as a reference value for validation. Altimeter 478 may also read an altitude value during the scanning process. If a reference value of altitude for QR 133 is stored in Memory 142, said reference value can be cross-referenced with a value that is indicated by Altimeter 478 at the time of scanning.

The person skilled in the art will understand that not all the modules described in FIG. 4 are necessary in all embodiments but rather that certain embodiments can be implemented by using subsets of the modules described.

Figure 5:
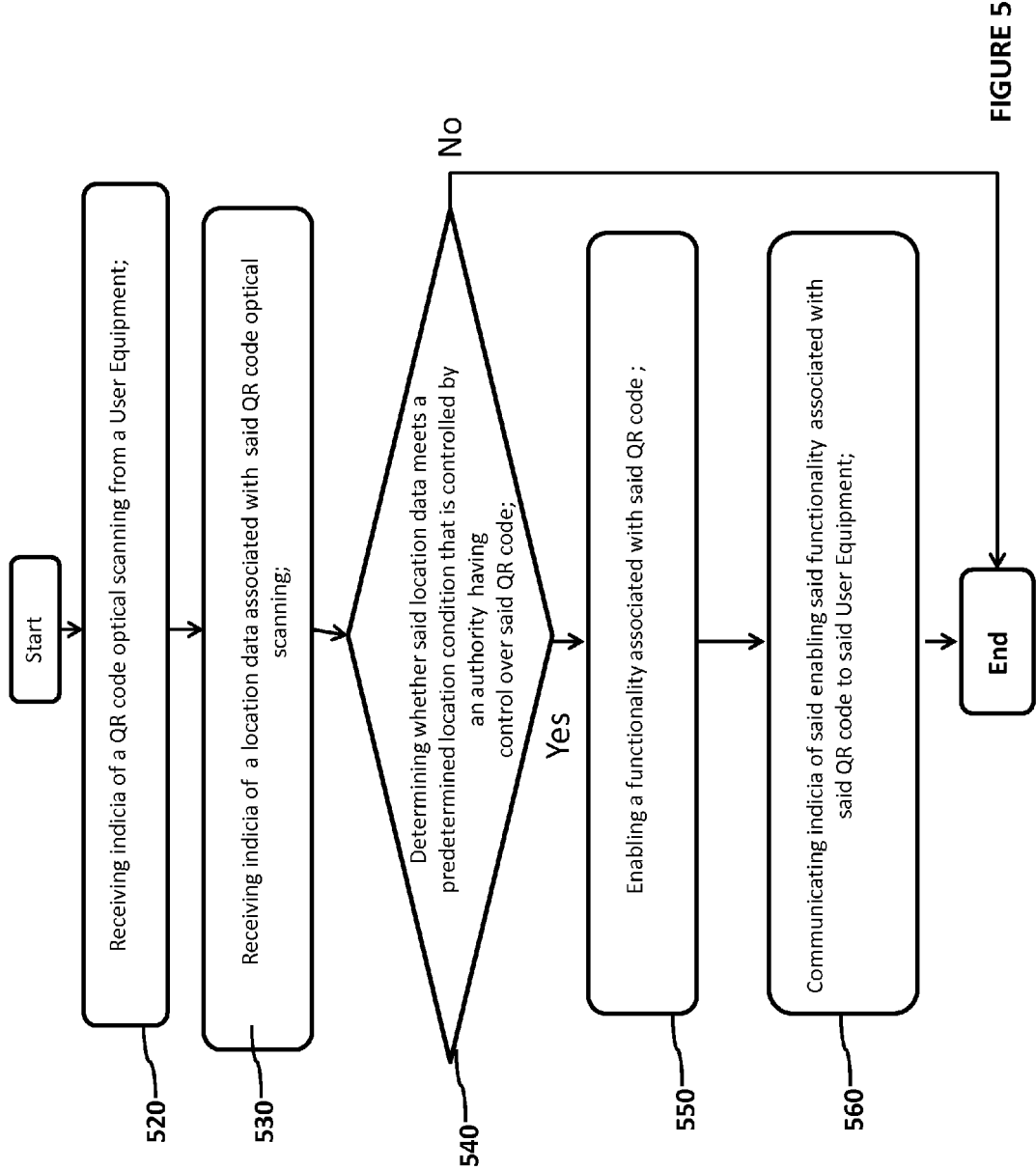
FIG. 5 represents a flow diagram of a possible embodiment of the invention based on a location attribute and an optical scanning.

FIG. 5 represents one exemplary flow diagram illustrating a method for enabling a functionality associated with the optical scanning of a QR code.

The flow diagram comprises:

Receiving indicia of a QR code optical scanning by a User Equipment; 520.

Receiving indicia of a location data associated with said QR code optical scanning; 530.

Determining whether said location data meets a predetermined location condition that is controlled by an authority having control over said QR code; 540.

Enabling a functionality associated with said QR code; 550.

Communicating indicia of said enabling said functionality associated with said QR code to said User Equipment; 560.

Embodiments of the present invention can be implemented in software, hardware, application logic or a combination of software, hardware and application logic. The software, application logic and/or hardware may reside on Server 100, UE 150 or 151, Owner Equipment 180 or Admin Equipment 181. If desired, part of the software, application logic and/or hardware may reside on Server 100, UE 150 or 151, Owner Equipment 180 or Admin Equipment 181. If desired part of all of the application logic can be downloaded as a software agent and can be used only when needed. In an example embodiment, the application logic, software or an instruction set is maintained on any one of various conventional computer-readable media. In the context of this document, a "computer-readable medium" can be any media or means that can contain, store, communicate, propagate or transport the instructions for use by or in connection with an instruction execution system, apparatus, or device, such as a computer, with one example of a computer described and depicted in FIG. 1, FIG. 3, and FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present invention as, defined in the appended claims.

What is claimed is:

1. A method comprising:

receiving indicia of a first optical scanning of a first optical code by a first user equipment via an encrypted channel;

receiving a first location indicia data associated with said first optical scanning of said first optical code from said first user equipment via an encrypted channel;

receiving indicia of a second optical scanning of said first optical code by a second user equipment via an encrypted channel;

receiving a second location indicia data associated with said second optical scanning of said first optical code from said second user equipment via an encrypted channel; and selectively enabling in said second user equipment via an encrypted channel a predetermined and restricted functionality associated with said first optical code, upon compliance to a predetermined proximity criterion, said compliance resulting, at least in part, from proximity determined between a first location, associated with said first location indicia data, and a second location, associated with said second location indicia data, wherein said predetermined and restricted functionality is selected from the group consisting of: a secure transfer of ownership of an asset associated with said first optical code, a secure authentication of an asset associated with said first optical code, a secure transfer of ownership of an object associated with said first optical code, a secure verification of the authenticity of an object associated with said first optical code, a secure verification of the authenticity of a document associated with said first optical code, a secure transfer of ownership of a document associated with said first optical code, and combinations thereof.

2. The method of claim 1, wherein, said proximity is determined by comparing said first location indicia data and said second location indicia data with a location indicia of record data for said first optical code and said location indicia of record data for said first optical code is controlled by an authority of record associated with said first optical code.

3. The method of claim 1, further comprising:

facilitating the creation of an alphanumerical code associated, at least temporarily, with said first optical code;

facilitating the transmission of said alphanumerical code to said first user equipment via an encrypted channel; and facilitating receiving said alphanumerical code from said second user equipment via an encrypted channel.

4. The method of claim 1, further comprising:

receiving indicia of an optical scanning of a second optical code associated with said first optical code from said first user equipment via an encrypted channel within a predetermined time period from said first optical scanning of said first optical code.

5. The method of claim 1, further comprising:

facilitating the comparison of an additional secure attribute of record data for said first optical code with a measurement of said attribute in connection with said first optical scanning of said first optical code by said first user equipment, wherein said additional secure attribute is selected from the group consisting of: a time based attribute, a digital image based attribute, a magnetic field based attribute, a spatial orientation based attribute, an altitude based attribute, an acoustic based attribute, and combinations thereof.

6. The method of claim 1, wherein, said proximity is derived through comparing said first location indicia data with said second location indicia data; and determining if a distance data, derived from said comparing, is below a predetermined threshold data.

7. The method of claim 1, wherein said first optical code has been encrypted with a public key whose corresponding private key is associated with a secure location indicia of record data for said first optical code.

8. At least one non-transitory computer-readable medium having a set of instructions for controlling at least one general-purpose digital computer in performing desired functions comprising:

a set of instructions formed into each of a plurality of modules, each modules comprising instructions for:
  facilitating the receiving indicia of a first optical scanning of a first optical code by a first user equipment via an encrypted channel;
  facilitating the receiving a first location indicia data associated with said first optical scanning of said first optical code from said first user equipment via an encrypted channel;
  facilitating the receiving indicia of a second optical scanning of said first optical code by a second user equipment via an encrypted channel;
  facilitating the receiving a second location indicia data associated with said second optical scanning of said first optical code from said second user equipment via an encrypted channel;
  and
  facilitating the selectively enabling in said second user equipment, via an encrypted channel, a predetermined and restricted functionality associated with said first optical code, upon compliance to a predetermined proximity criterion, said compliance resulting, at least in part, from proximity determined between a first location, associated with said first location indicia data, and a second location, associated with said second location indicia data, wherein said predetermined and restricted functionality is selected from the group consisting of: a secure transfer of ownership of an asset associated with said first optical code, a secure authentication of an asset associated with said first optical code, a secure transfer of ownership of an object associated with said first optical code, a secure verification of the authenticity of an object associated with said first optical code, a secure verification of the authenticity of a document associated with said first optical code, a secure transfer of ownership of a document associated with said first optical code, and combinations thereof.

9. The non-transitory computer-readable medium of claim 8,
  wherein said proximity is derived from comparing said first location indicia data and said second location indicia data with a location indicia of record data for said first optical code and said location indicia of record data for said first optical code is controlled by an authority of record associated with said first optical code.

10. The non-transitory computer-readable medium of claim 8, further comprising modules comprising instructions for:
  facilitating the creation of an alphanumerical code associated, at least temporarily, with said first optical code;
  facilitating the transmission of said alphanumerical code to said first user equipment via an encrypted channel; and
  facilitating receiving said alphanumerical code from said second user equipment via an encrypted channel.

11. The non-transitory computer-readable medium of claim 8, further comprising modules comprising instructions for:
  facilitating receiving indicia of an optical scanning of a second optical code associated with said first optical code from said first user equipment via an encrypted channel within a predetermined time period from said first optical scanning of said first optical code.

12. The non-transitory computer-readable medium of claim 8, further comprising modules comprising instructions for:
  facilitating the comparison of an additional secure attribute of record data for said first optical code with a measurement of said attribute in connection with said first optical scanning of said first optical code by said first user equipment, wherein said additional secure attribute is selected from the group consisting of: a time based attribute, a digital image based attribute, a magnetic field based attribute, a spatial orientation based attribute, an altitude based attribute, an acoustic based attribute, and combinations thereof.

13. The non-transitory computer-readable medium of claim 8, wherein said proximity is derived by comparing said first location indicia data with said second location indicia data; and
  by determining if a distance related data, derived from said comparing, is below a predetermined threshold data.

14. The non-transitory computer-readable medium of claim 8, wherein said proximity is derived by comparing wireless local area network data associated with said first location indicia data with wireless local area network data associated with said second location indicia data.

15. An apparatus, comprising:
  at least one processor; and at least one non-transitory computer-readable medium including a computer program code; the at least one non-transitory computer-readable medium and the computer program code configured to, with the at least one processor, cause the apparatus to perform at least the following:
  facilitating the receiving of indicia of a first optical scanning of a first optical code by a first user equipment via an encrypted channel;
  facilitating the receiving of a first location indicia data associated with said first optical scanning of said first optical code from said first user equipment via an encrypted channel;
  facilitating the receiving of indicia of a second optical scanning of said first optical code by a second user equipment via an encrypted channel;
  facilitating the receiving of a second location indicia data associated with said second optical scanning of said first optical code from said second user equipment via an encrypted channel;
  facilitating selectively enabling in said second user equipment, via an encrypted channel, a predetermined and restricted functionality associated with said first optical code, upon compliance to a predetermined proximity criterion, said compliance resulting, at least in part, from proximity determined between a first location, associated with said first location indicia data, and a second location, associated with said second location indicia data, wherein said predetermined and restricted functionality is selected from the group consisting of: a secure transfer of ownership of an asset associated with said first optical code, a secure authentication of an asset associated with said first optical code, a secure transfer of ownership of an object associated with said first optical code, a secure verification of the authenticity of an object associated with said first optical code, a secure verification of the authenticity of a document associated with said first optical code, a secure transfer of ownership of a document associated with said first optical code, and combinations thereof.

16. The apparatus of claim 15, wherein said proximity criterion is derived from comparing said first location indicia data and said second location indicia data with a location indicia of record data for said first optical code wherein said location indicia of record data for said first optical code is controlled by an authority of record associated with said first optical code.

17. The apparatus of claim 15, further causing to perform at least the following:

facilitating the creation of an alphanumerical code associated, at least temporarily, with said first optical code;

facilitating the transmission of said alphanumerical code to said first user equipment via an encrypted channel; and facilitating the receiving of said alphanumerical code from said second user equipment via an encrypted channel.

18. The apparatus of claim 15, further causing to perform at least the following:

facilitating the receiving of indicia of an optical scanning of a second optical code associated with said first optical code from said first user equipment via an encrypted channel within a predetermined time period from said first optical scanning of said first optical code.

19. The apparatus of claim 15, further causing to perform at least the following:

facilitating the comparison of an additional secure attribute of record data for said first optical code with a measurement of said attribute in connection with said first optical scanning of said first optical code by said first user equipment, wherein said additional secure attribute is selected from the group consisting of: a time based attribute, a digital image based attribute, a magnetic field based attribute, a spatial orientation based attribute, an altitude based attribute, an acoustic based attribute, and combinations thereof.

20. The apparatus of claim 15, wherein said proximity is derived from comparing said first location indicia data with said second location indicia data; and determining if a distance data, derived from said comparing, is below a predetermined threshold.

* * * * *